United States Patent [19]

Lentz et al.

[11] Patent Number: 5,046,174
[45] Date of Patent: Sep. 3, 1991

[54] METHOD OF CLUTCH-TO-CLUTCH CLOSED THROTTLE DOWNSHIFT IN AN AUTOMATIC TRANSMISSION

[75] Inventors: Carl A. Lentz, Mooresville, Ind.; John A. Hibner, Coldwater, Ohio

[73] Assignee: General Motors Corporation, Detroit, Mich.

[21] Appl. No.: 464,054

[22] Filed: Jan. 11, 1990

[51] Int. Cl.$^5$ ............................................. B60K 41/02
[52] U.S. Cl. ..................................... 364/424.1; 74/866
[58] Field of Search ............... 364/424.1; 74/866, 867; 192/0.52, 0.56, 3.3, 3.31

[56] References Cited

U.S. PATENT DOCUMENTS

| | | | |
|---|---|---|---|
| 4,653,351 | 3/1987 | Downs et al. | 74/866 |
| 4,671,139 | 6/1987 | Downs et al. | 74/866 |
| 4,757,886 | 7/1988 | Brown et al. | 192/3.3 |
| 4,765,450 | 8/1988 | Kurihara et al. | 192/0.052 |
| 4,796,490 | 1/1989 | Butts et al. | 74/866 |
| 4,875,391 | 10/1989 | Leising et al. | 74/866 |
| 4,893,527 | 1/1990 | Furusawa et al. | 74/866 |
| 4,913,004 | 4/1990 | Panoushek et al. | 364/424.1 |
| 4,955,259 | 9/1990 | Narita | 74/866 |

Primary Examiner—Salvatore Cangialosi
Attorney, Agent, or Firm—Mark A. Navarre

[57] ABSTRACT

In an automatic transmission, clutch-to-clutch closed throttle downshifting is controlled by filling the on-coming clutch at a maximum pressure command for a set period while commanding the off-going clutch pressure to a low value and exhausting the off-going clutch before the end of the fill period. At the end of the fill period the on-coming pressure is set to an initial value and then ramped up until turbine speed is pulled up due to off-going clutch slippage. Then a closed-loop profile control period starts wherein the slip of the on-coming clutch is measured and controlled to a slip profile. When synchronization of the on-coming clutch is detected, maximum pressure is commanded. If the throttle is opened during the downshift, the algorithm reverts to a powered downshift algorithm if the off-going clutch still has pressure or to an open-loop ramp control of the on-coming clutch if the off-going clutch has been exhausted.

7 Claims, 16 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

METHOD OF CLUTCH-TO-CLUTCH CLOSED THROTTLE DOWNSHIFT IN AN AUTOMATIC TRANSMISSION

FIELD OF THE INVENTION

This invention relates to a control method for an automatic transmission, and more particularly, to such a method for controlling a clutch-to-clutch closed throttle downshift.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high speed ratio. In the type of transmission involved in this invention, the downshift is accomplished by disengaging a clutch associated with the lower speed ratio and engaging a clutch associated with the higher speed ratio to thereby reconfigure the gear set to operate at the higher speed ratio. Shifts performed in the above manner are termed clutch-to-clutch shifts and require precise timing in order to achieve high quality shifting.

SUMMARY OF THE INVENTION

It is therefore an object of the invention to provide a method of controlling a closed throttle downshift in an automatic transmission by disengaging one clutch and engaging another clutch in a controlled manner, and using transmission speed feedback to manage the control. In particular, a motor vehicle automatic transmission with an electronic control system achieves high quality closed throttle downshifts by monitoring input and output speeds to coordinate on-coming clutch application and off-going clutch release. During the closed throttle downshift, the on-coming clutch slip speed is reduced to zero rpm while following a computed profile by use of closed-loop control of the on-coming clutch pressure command. The system also monitors throttle position and, when the throttle is opened during a closed throttle shift, performs a transition from closed throttle downshift control to powered downshift control if the off-going clutch still has pressure, or performs a transition from closed-loop to open-loop control of the on-coming clutch if the off-going clutch has been exhausted.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a-3b are flow diagrams representative of computer program instructions executed by the computer based controller of FIG. 1a in carrying out the shift control of tee transmission.

DETAILED DESCRIPTION OF THE INVENTION

Figure 1A:
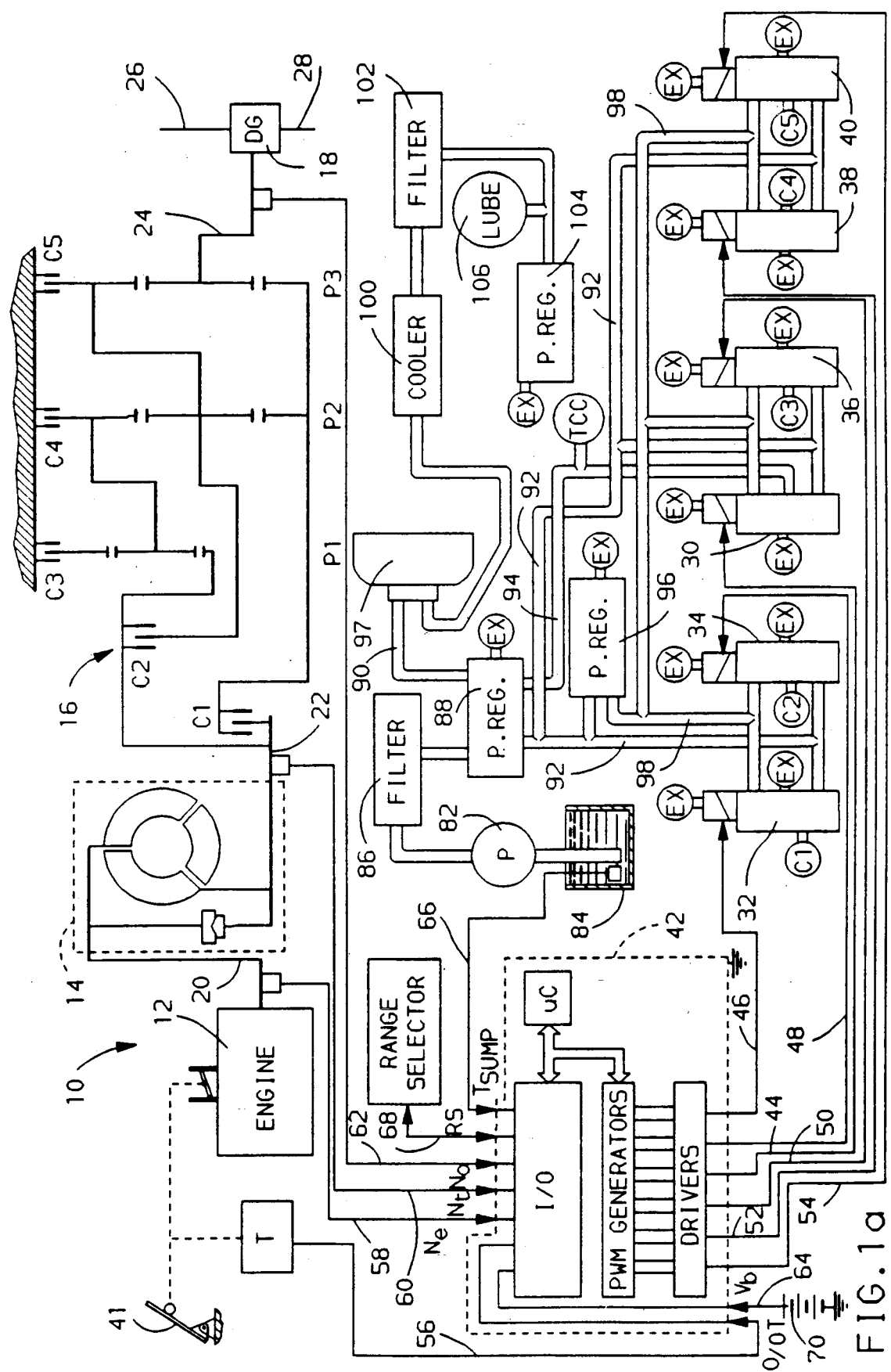
FIG. 1a is a system diagram of a fluid operated motor vehicle transmission, including several solenoid operated fluid pressure control valves and a computer-based control unit for carrying out the control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and five fluid operated transmission clutches, designated C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the Polak U.S. Pat. No. 4,070,927, issued Jan. 31, 1978, and assigned to the assignee of the present invention. An operator manipulated accelerator pedal 41 positions the engine throttle for controlling the engine power output.

The operation of the solenoid operated control valves 30–40 is controlled by a computer-based control unit 42 via lines 44–54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, theristors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30–40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1–C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30–40, and also to the control pressure regulator valve 96. The control pressure regulator valve 96 develops a somewhat lower pressure in line 98, referred to herein as the control pressure, such pressure being directed to the solenoid of each control valve 30–40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
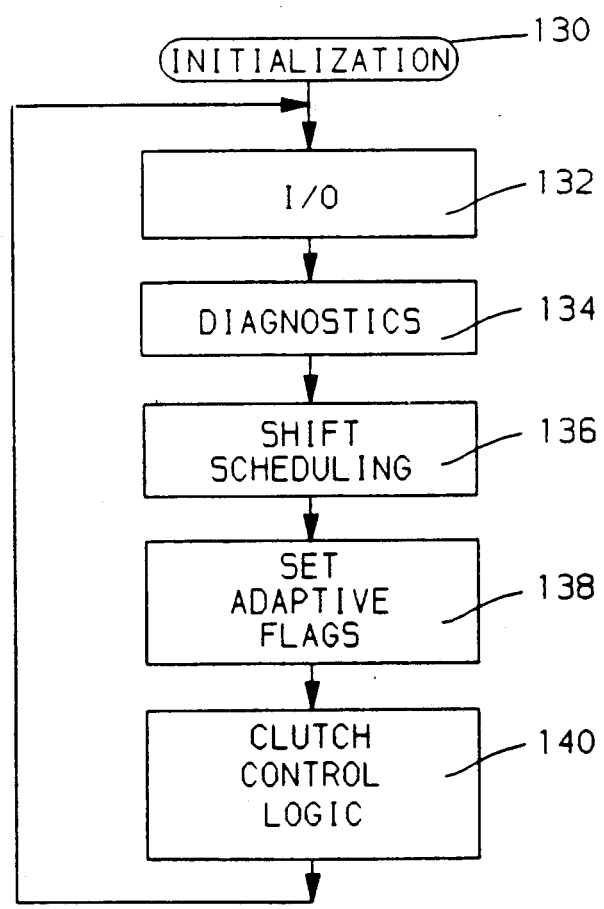

FIGS. 2, 3, 6–12, 14 and 15 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132–140 are sequentially and repeatedly executed as indicated by the flow diagram lines. Block 132 reads the various input signal values and outputs the required control signals to the PWM generators and drivers for solenoid controlled valves 30–40. Blocks 134–138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a–3b.

Figure 3A:
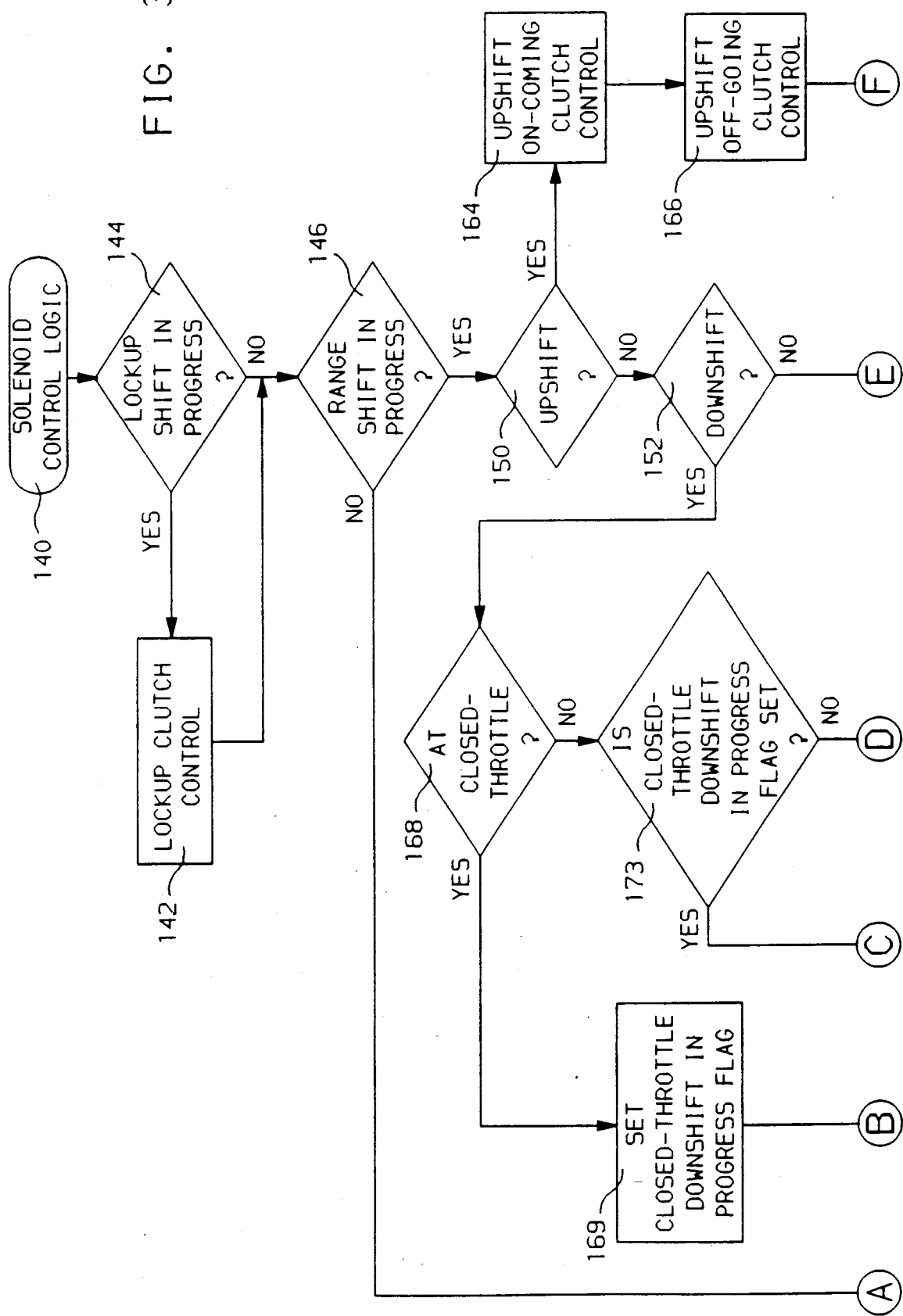
Figure 3B:
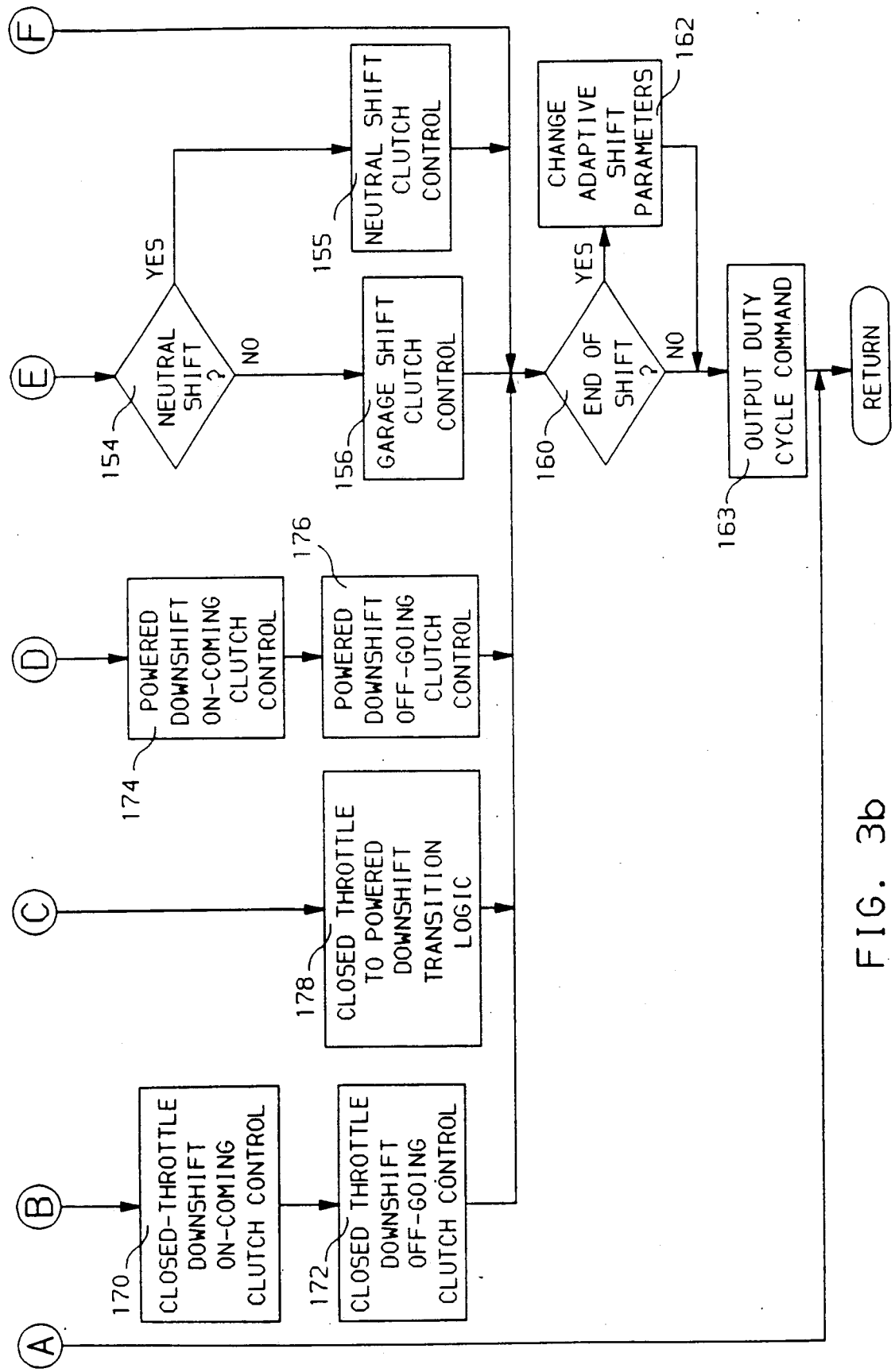

The flow diagram of FIGS. 3a–3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
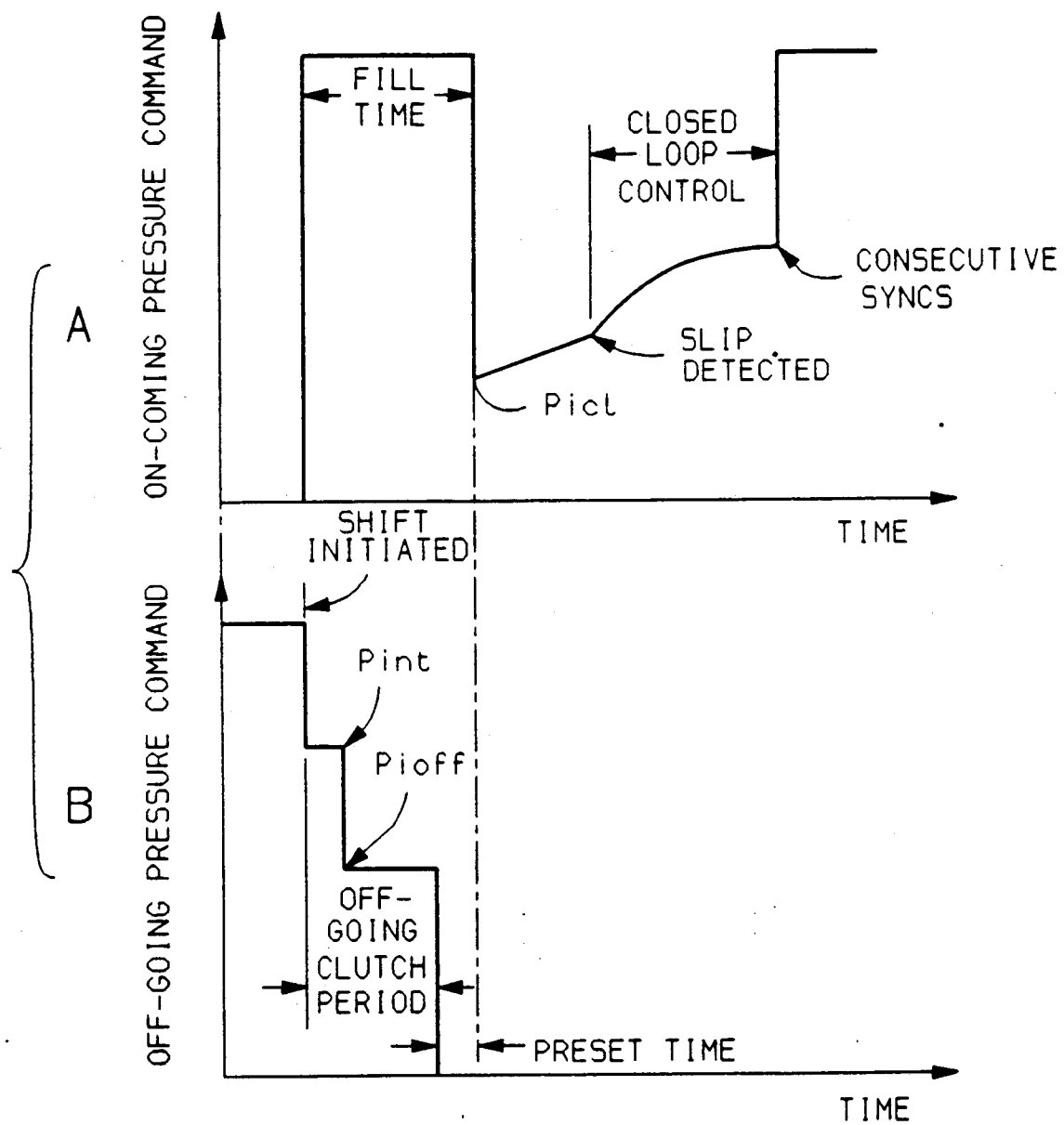
FIG. 4, graphs A and B, illustrate on-coming pressure command and off-going pressure command, respectively, for clutch to clutch shifting according to the invention.

FIG. 4, graphs A and B, respectively, show the on-coming and off-going pressure commands for control of the on-coming and off-going clutches during a closed throttle downshift. At shift initiation, the on-coming pressure command is set to maximum for a fill time to prepare the on-coming clutch to accept torque. During the fill time, the off-going clutch pressure command is stepped to an intermediate value Pint for a set time, and is then stepped to a lower value Pioff until a preset time before the end of the fill time. Thus, the fill time less the preset time determines the off-going clutch period. Then the off-going clutch is exhausted so that the on-coming clutch can take over when it is ready. The on-coming clutch pressure command is set to an initial closed-loop pressure Pic1 and then ramped up until slip of the off-going clutch (or turbine pullup) is detected. Turbine pullup is a result of the beginning of off-going clutch slip. Pullup is detected when the turbine speed Nt becomes greater than the product of the output speed No and the old or lower speed ratio SR(old) plus a constant K1, or $Nt > No*SR(old) + K1$.

The off-going clutch slip triggers closed-loop control of the on-coming clutch pressure. The on-coming clutch slip is monitored and controlled to a calculated slip profile. This closed-loop slip profile control continues until on-coming clutch synchronization has been detected for several consecutive times. Synchronization is detected when the turbine speed Nt is within a threshold value, K2, of the output speed times the new or high speed ratio, or $ABS[Nt - No*SR(new)] \leq K2$.

Figure 5:
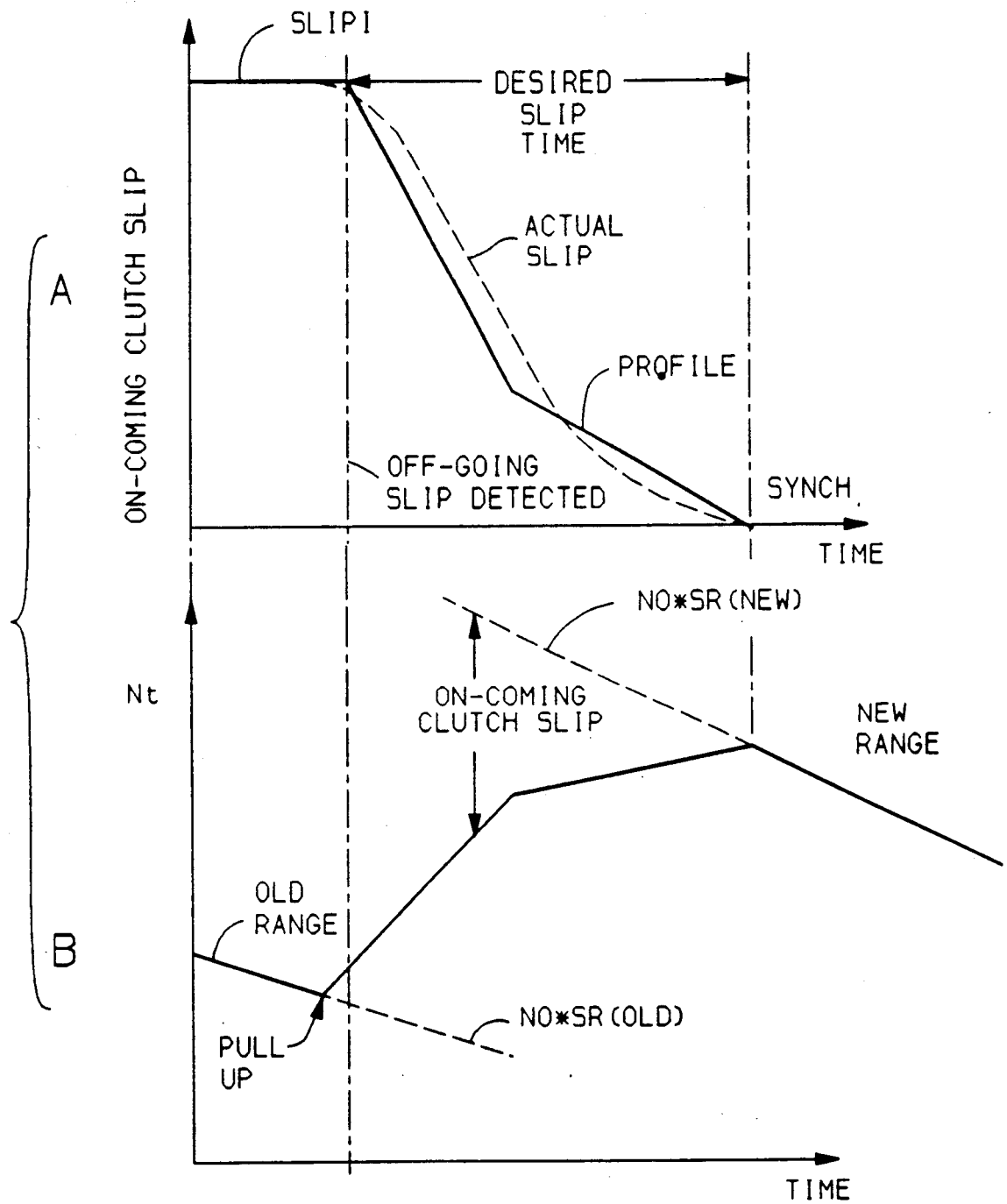
FIG. 5, graphs A and B, are a slip diagram and a turbine speed diagram of the on-coming clutch for the closed-loop operation thereof according to the invention.
Figure 6:
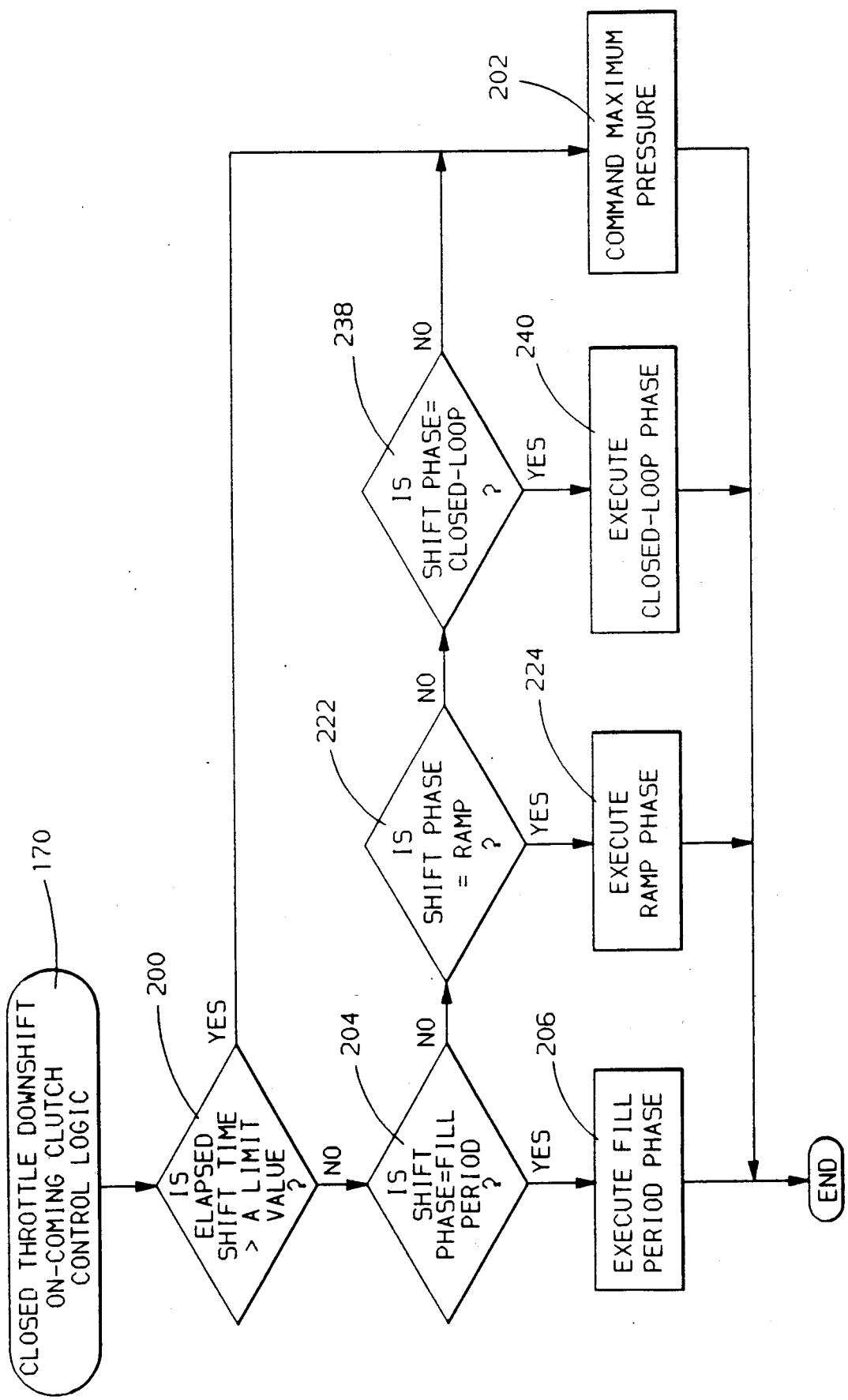
FIGS. 6 through 9 are flow diagrams illustrating the closed throttle downshift logic for the on-coming clutch, according to the invention.
Figure 7:
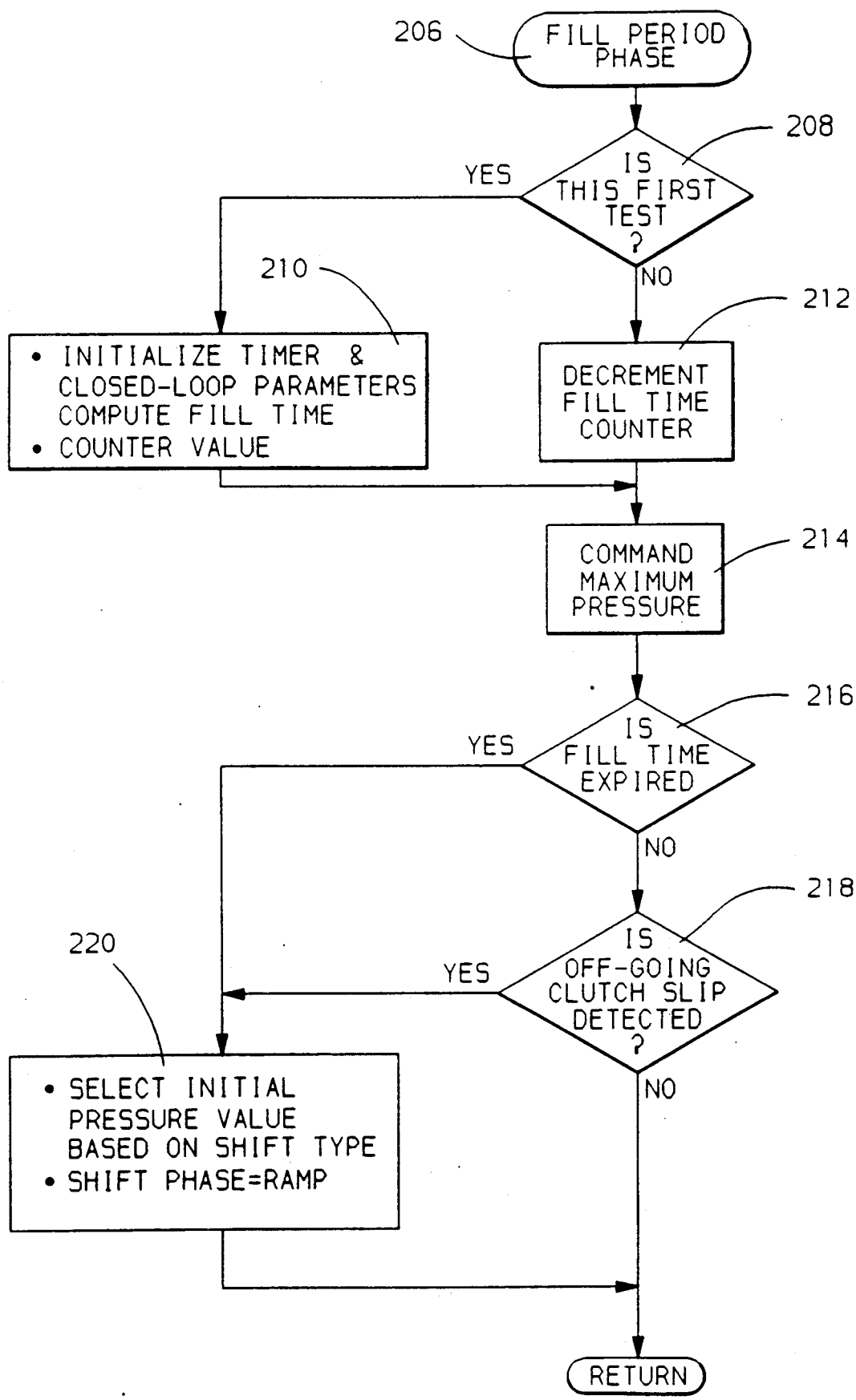
Figure 8:
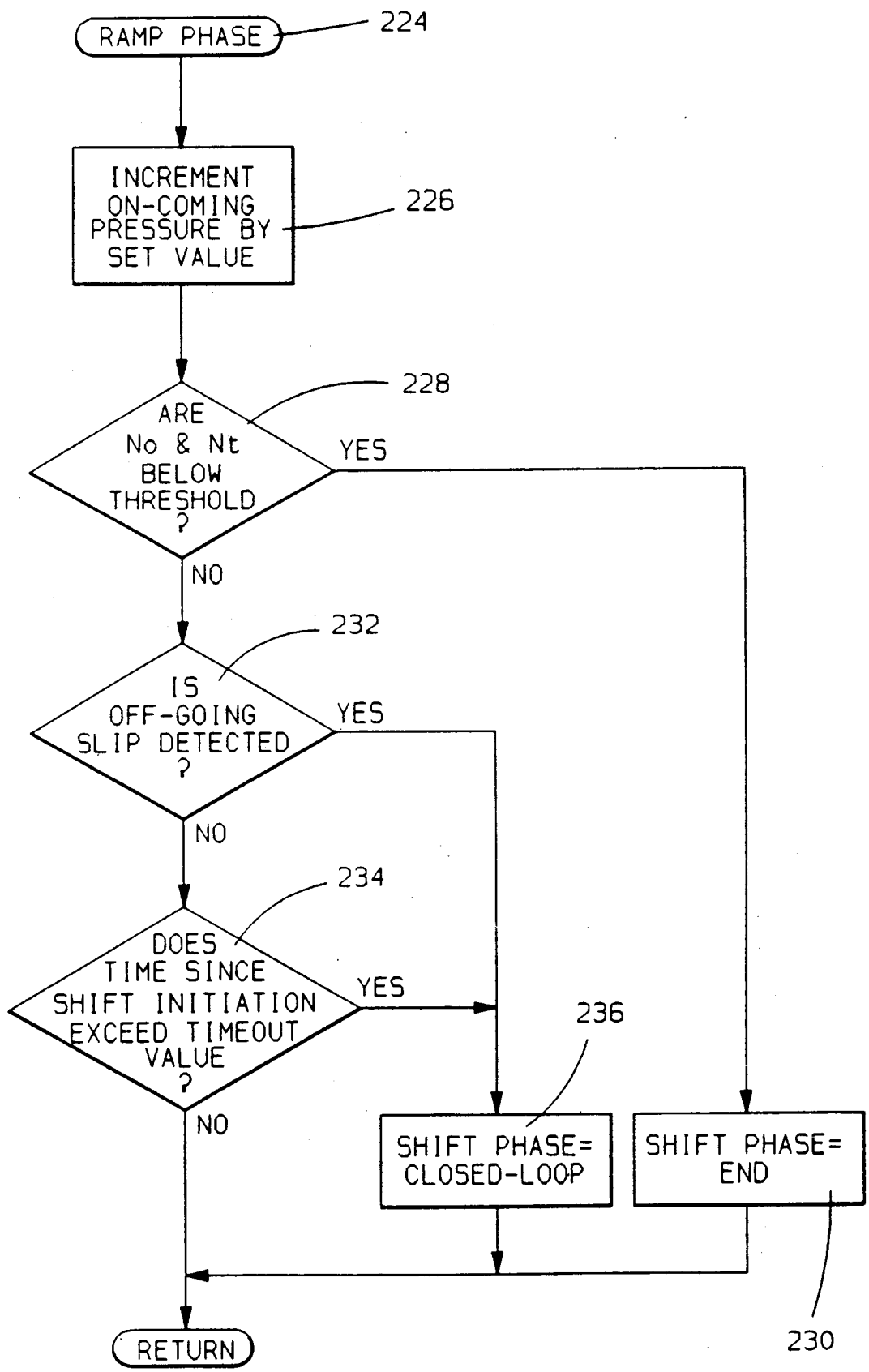

The closed-loop profile control is better explained with reference to FIG. 5, graph A, which shows the on-coming clutch slip speed profile in solid lines and actual slip speed in dashed lines. Slip speed is determined by comparing the turbine speed to the output speed. Specifically, slip speed is the difference (times a conversion factor K3) between turbine speed and the product of the output speed and the speed ratio of the higher or new range, or algebraically, $SLIP = K3*[Nt - (No*SR(new)]$.

Thus, as soon as a shift command is issued, there is slip in the on-coming clutch. The initial slip speed, SLIPI, is the slip value at the initiation of closed loop. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the on-coming clutch. By using slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP = <C1*SLIPI, the slope changes to slope 2. The constant C2 is the desired time to utilize the first slope. The constant C3 is the desired overall closed-loop time. The constants C2 and C3 are used only for the slope calculation and not for direct timing purposes. The first and second slopes SLOPE1, SLOPE2 are defined as:

$SLOPE1 = [SLIPI - (C1*SLIPI)]/C2$; and
$SLOPE2 = C1*SLIPI/(C3 - C2)$.

The closed-loop profile control is carried out by correcting the on-coming clutch command pressure by a term which is proportional to slip speed error. The effect on turbine speed is shown in FIG. 5, graph B, where pullup is detected when turbine speed increases a certain amount above the lower dashed line which represents the product of output speed and speed ratio for the old range. Thereafter the turbine speed increases in accordance with the profile control where on-coming clutch slip speed is seen to be the difference between the turbine speed curve and the upper dashed line which represents the product of output speed and speed ratio for the new range. The arrival at synchronization speed as determined by detecting sync a preset number of times in consecutive loops completes the closed-loop profile control. At that time maximum pressure is applied to the on-coming clutch.

The control has several advantages. The off-going pressure intermediate value Pint reduces clutch pressure undershoot caused by solenoid dynamics. The lower off-going pressure Pioff is sufficient to maintain the old range and allows transition to off-going clutch control in the event of a throttle increase before the off-going clutch is exhausted. By exhausting the off-going clutch before the end of fill time, it is assured that off-going clutch capacity is removed before application of the on-coming clutch and thereby eliminates clutch tie-up and associated shift quality degradation.

The off-going clutch slip is used to detect turbine pullup and thereby indicate that on-coming clutch capacity has been achieved. This automatically times the application of closed-loop control. The on-coming pressure command is ramped up following fill termination to achieve a timely turbine pullup when the initial on-coming command pressure is low. If the off-going clutch slip is detected during the fill period, the fill period is terminated early to reduce the overfill torque disturbance.

The closed-loop profile controls the on-coming clutch slip (rather than turbine speed) to insure that changes in output speed (due to braking) are also taken into account when controlling shift duration. The reduced slope (initiated after a specified fraction of the initial on-coming clutch slip is achieved) reduces the end of shift torque disturbance by more closely matching the acceleration rates on both sides of the on-coming clutch. Maintaining closed-loop control until sync has been detected in several consecutive control loops assures that true sync has been achieved and maintained before full clutch application is made. As will be seen in the flow diagrams to be described, closed-loop control is suspended and the on-coming clutch is fully applied when both turbine and output speeds are below a threshold value. This insures timely shift completion at zero or near zero vehicle speed.

The on-coming clutch logic 170 is shown in FIGS. 6 through 9. In these diagrams, SHIFT PHASE is a pointer that indicates which shift operation is beginning or is underway. If elapsed time from the shift initiation is greater than a set limit value <200>, maximum pressure is commanded <202>. This forces a shift completion within a time limit. If the time has not elapsed and SHIFT PHASE equals FILL PERIOD <204>, the Fill Period routine (FIG. 7) is run <206>. In the first loop of the routine <208>, timers and closed-loop parameters are initialized and the fill time counter value is computed <210>. In subsequent loops, the fill time counter is decremented <212> and the maximum pressure is commanded <214>. If the fill time counter reaches zero <216> or off-going clutch slip is detected <218>, the initial on-coming clutch pressure value, Pic1, is selected based on the shift type and SHIFT PHASE is set equal to RAMP <220>. Otherwise, the routine repeats until the fill time expires or slip is detected.

If SHIFT PHASE equals RAMP <222>, the Ramp phase is executed <224>. In the Ramp phase (FIG. 8) the on-coming pressure is incremented by a set value <226>. If both transmission output speed, No, and turbine speed, Nt, are below a near zero threshold value <228>, SHIFT PHASE is set to END <230>. If the speeds are not below the threshold, and if either off-going slip is detected <232>, or the time since shift initiation exceeds a timeout value <234>, SHIFT PHASE is set equal to CLOSED-LOOP <236>.

Figure 9:
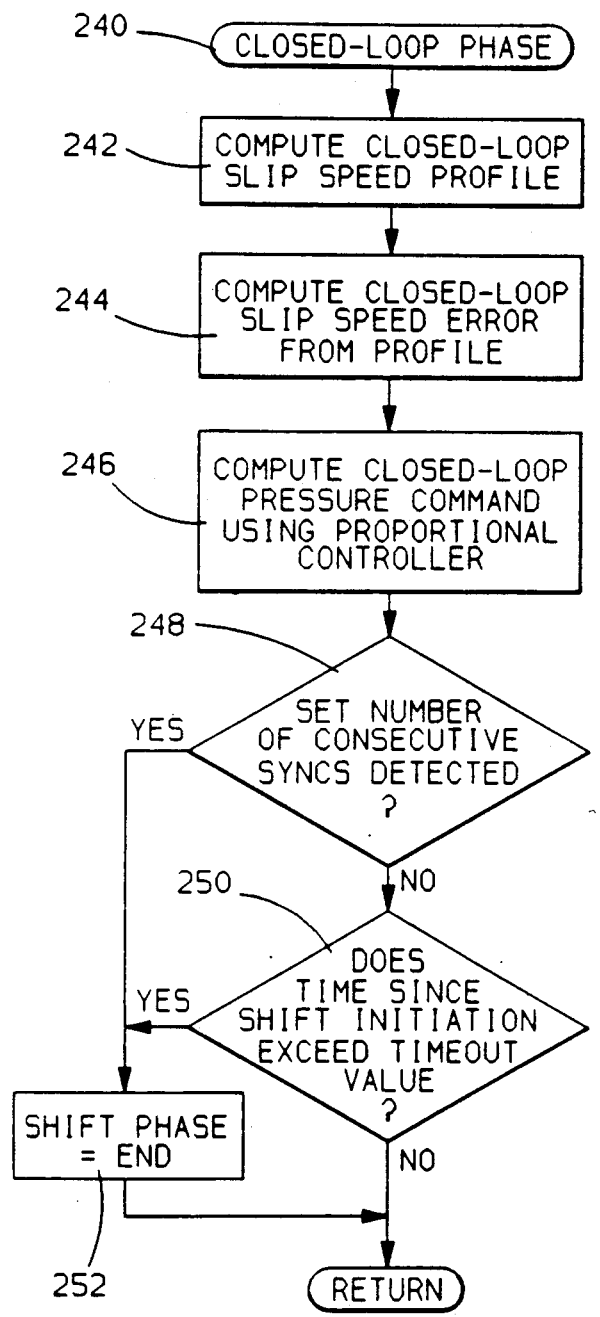

If SHIFT PHASE equals CLOSED-LOOP <238>, the Closed-loop phase is executed <240>. As shown in FIG. 9, the closed-loop slip profile is calculated <242>, the slip speed error is computed <244>, and the closed-loop pressure command is computed by proportional control <246>. Then, if a predefined number of consecutive on-coming clutch syncs are detected <248> or the time since shift initiation exceeds a timeout value <250>, SHIFT PHASE is set to END <252> to effect maximum pressure and complete the shift.

Figure 10:
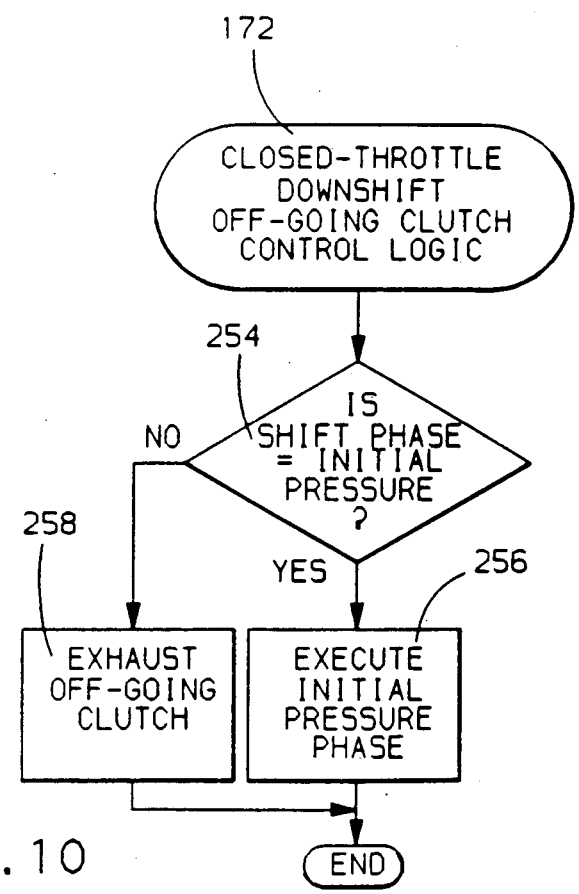
FIGS. 10 and 11 are flow diagrams illustrating the closed throttle downshift logic for the off-going clutch, according to the invention.
Figure 11:
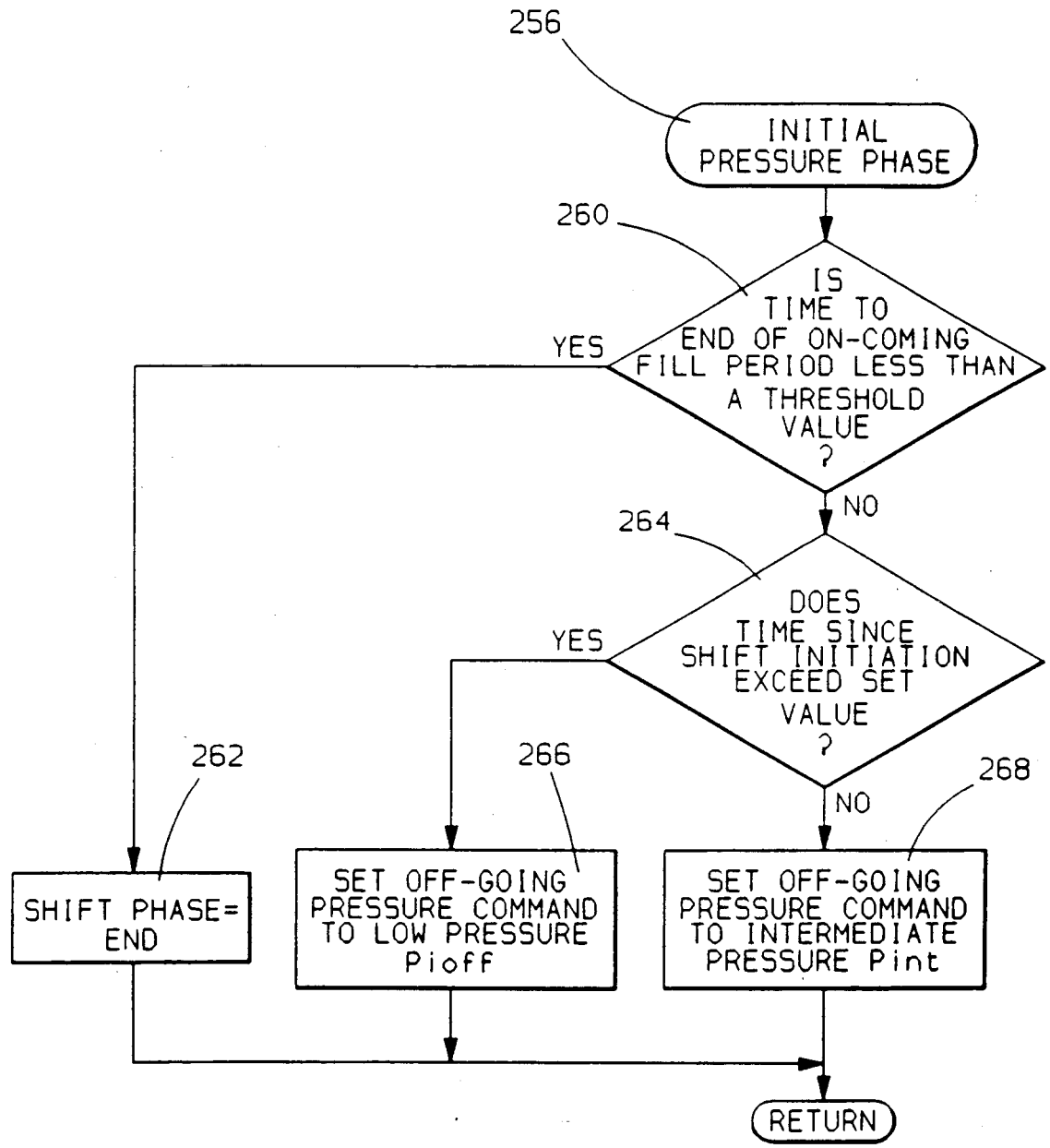

For the off-going clutch control logic 172 shown in FIGS. 10 and 11, if SHIFT PHASE equals INITIAL PRESSURE <254>, the Initial Pressure phase is executed <256>; otherwise the off-going clutch is exhausted <258>. In the Initial Pressure phase <256>, if the remaining time to the end of the fill period is less than a threshold value <260>, SHIFT PHASE is set to END <262> to exhaust the clutch. Otherwise, if the time since shift initiation exceeds a set value <264>, the off-going pressure command is set to the low set value then the off-going pressure command is set to the intermediate pressure Pint <268>.

In the event that the throttle position increases after the closed throttle downshift program has been initiated, two special routines are provided to accommodate the fact that the shift is no longer a closed throttle shift. One routine is effected if the throttle increase is detected while the pressure command to the off-going clutch is still above zero; then a transition is made to a powered downshift program which controls the shift by adjusting the off-going clutch pressure command. The other routine is effected if the throttle increase is detected after the off-going clutch is exhausted; then the on-coming clutch pressure is controlled in ramp fashion to shift completion.

Figure 12:
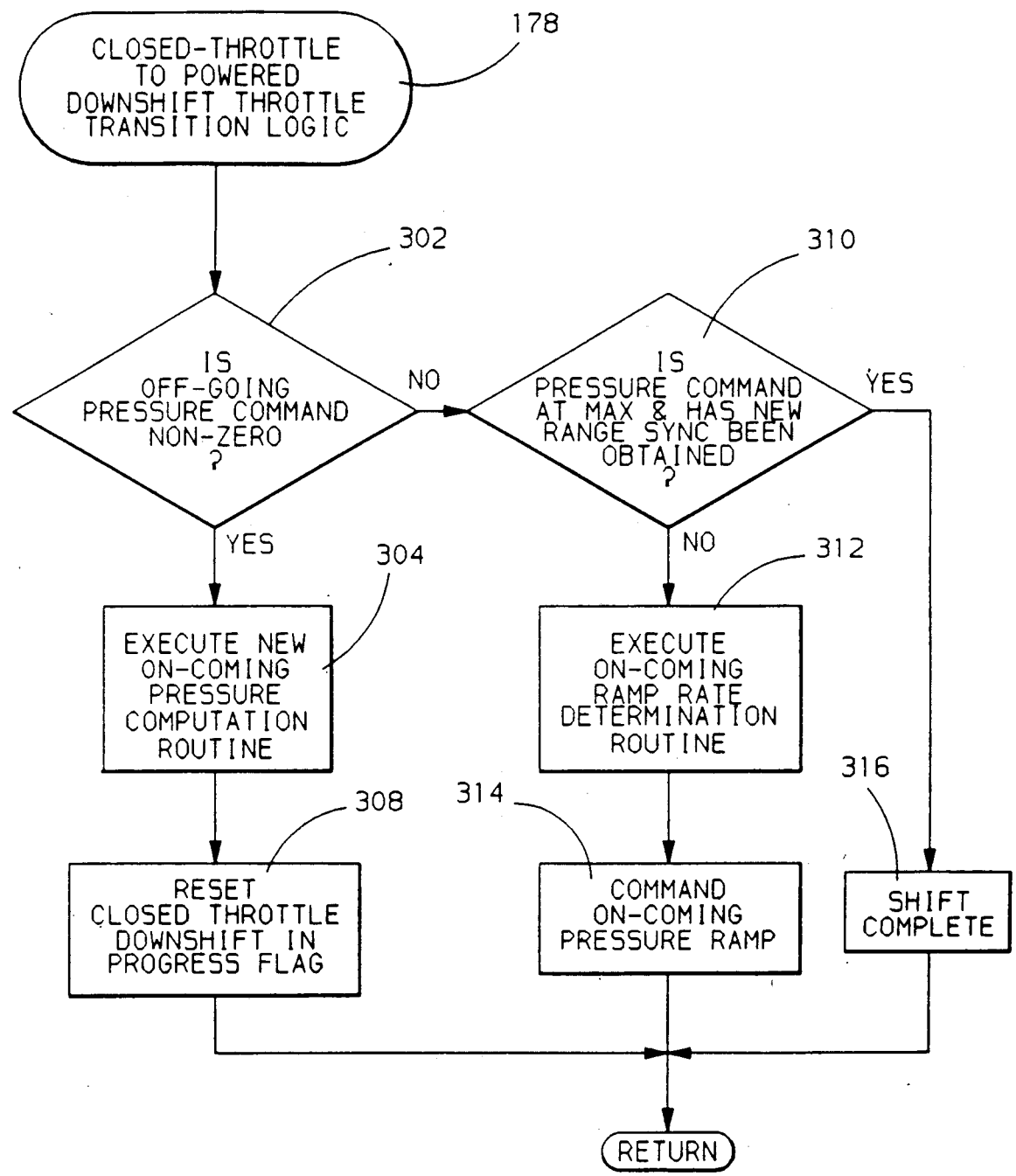
FIGS. 12, 14 and 15 are flow diagrams illustrating transition logic for throttle increase during closed throttle downshift, according to the invention.

FIG. 12 is the flow diagram for effecting a transition in response to detecting a throttle increase <178>. If the off-going pressure command is not zero <302>, a routine is executed to compute a new on-coming pressure <304>. The CLOSED THROTTLE DOWNSHIFT IN PROGRESS flag is reset <308> to allow the transition to a powered downshift using the new on-coming pressure Pion which will occur on the next control loop and the existing off-going clutch pressure. If the off-going pressure command is zero <302>, a test is made for shift completion based on pressure command value and clutch sync <310>. If the test is not satisfied, an on-coming ramp rate determination routine is executed <312> and on-coming ramp pressure is commanded <314> until the shift completion test is satisfied <310>. When the test is satisfied the program goes to Shift Complete <316>.

Figure 13:
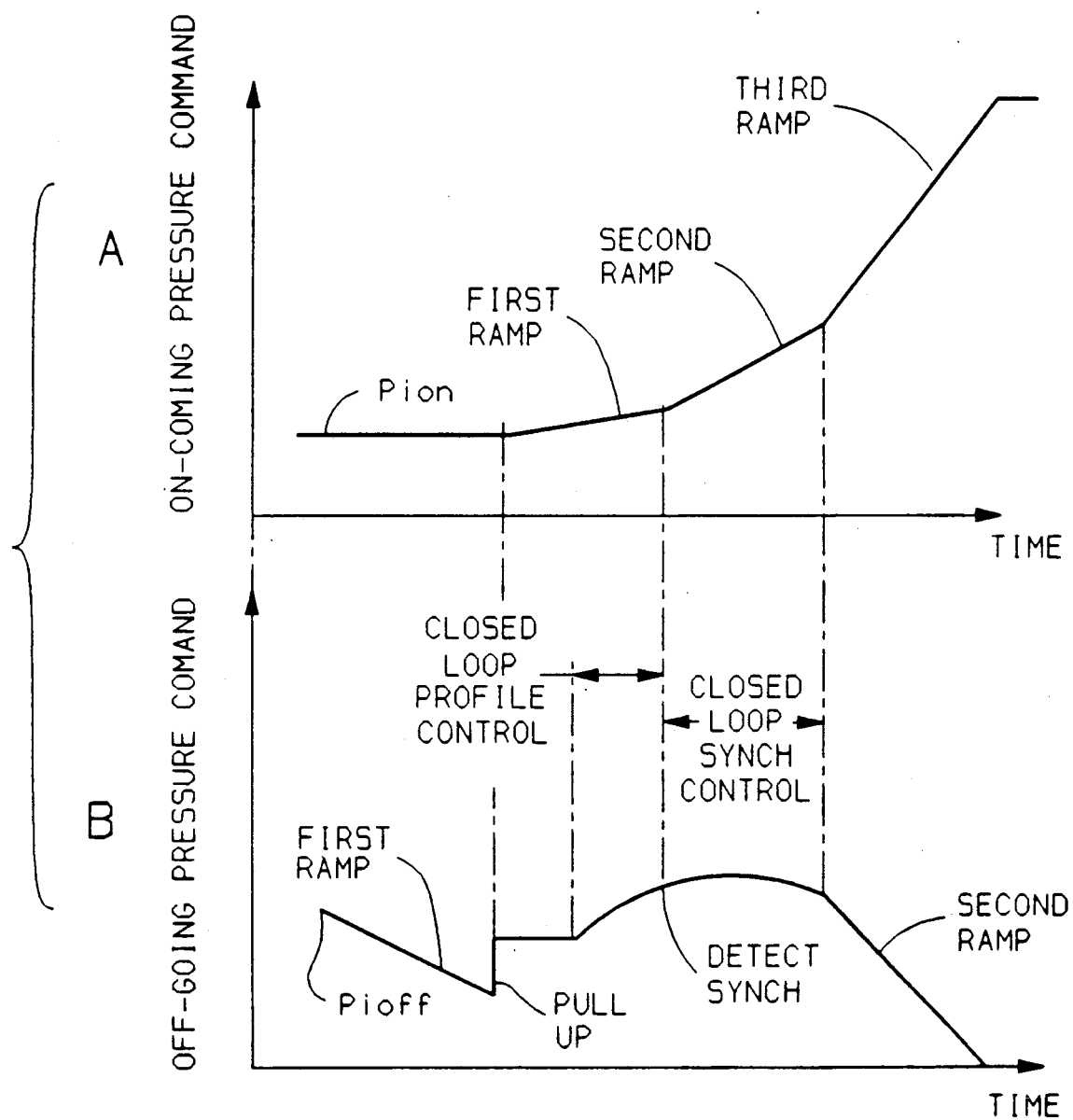
FIG. 13, graphs A and B, are on-coming and off-going pressure command curves for powered downshift clutch control.

FIG. 13, graphs A and B, respectively, show the on-coming and off-going pressure commands for control of the on-coming and off-going clutches after transitioning to a powered downshift. Immediately following the transition, the off-going clutch pressure command is ramped downward at a programmed rate until turbine speed pullup occurs. During this same time interval, the initial on-coming pressure command, P-ion, is set at a low "fill" pressure level to prepare for the time when on-coming clutch must engage.

When the off-going clutch starts to slip, the coefficient of friction of the clutch changes from a static to a dynamic level. The friction reduction and its associated decrease in clutch torque capacity is compensated for by increasing the clutch pressure in a step fashion to a level at which the torque capacity of the clutch remains nearly constant. This pressure command level is maintained for a preset time or until one clutch sync or over sync is detected (whichever occurs first). If the preset time has elapsed before on-coming clutch synchronization, the off-going clutch pressure command is determined by a closed-loop control signal which attempts to maintain the slip of the on-coming clutch on a slip profile. This closed-loop slip profile control continues until one on-coming clutch sync or over sync has been detected. Beginning at the detected pullup and continuing through this interval of off-going profile closed-loop control, the on-coming clutch pressure is ramped upward at a first ramp rate.

Proportional control is carried out by correcting the off-going clutch command pressure by a term which is proportional to slip speed error. The arrival at synchronization speed, as determined by detecting sync one time, completes the closed-loop profile control. Ideally, the slip converges to zero but in some conditions, the turbine speed exceeds the target value resulting in turbine flare, and a closed-loop sync control is invoked to bring the slip speed to zero by an integral-plus-proportional control. Simultaneously, the ramp rate of the on-coming clutch pressure command is increased to a second ramp rate which is greater than the first. The closed-loop sync control continues until a preset number of additional syncs are detected. Then to complete the shift, the off-going pressure is ramped toward zero and the on-coming pressure is increased toward a maximum value at a third ramp rate which is greater than the second ramp rate.

To invoke the powered downshift program and make a smooth transition, a suitable value for the initial on-coming pressure command, Pion, must be determined. The determination is based on a set value Pion1 which is correct for the case where the throttle increase is detected at shift initiation, and another value, Pion2, which is correct for the case when the throttle increase is detected at the time of off-going clutch exhaust. The second value, Pion2, is the closed throttle downshift set pressure, Pic1, less a set value K4. When the throttle increase is detected at an intermediate time, the program interpolates between Pion1 and Pion2 according to the proportion of remaining off-going clutch time before exhaust to the whole off-going clutch initial pressure phase.

Figure 14:
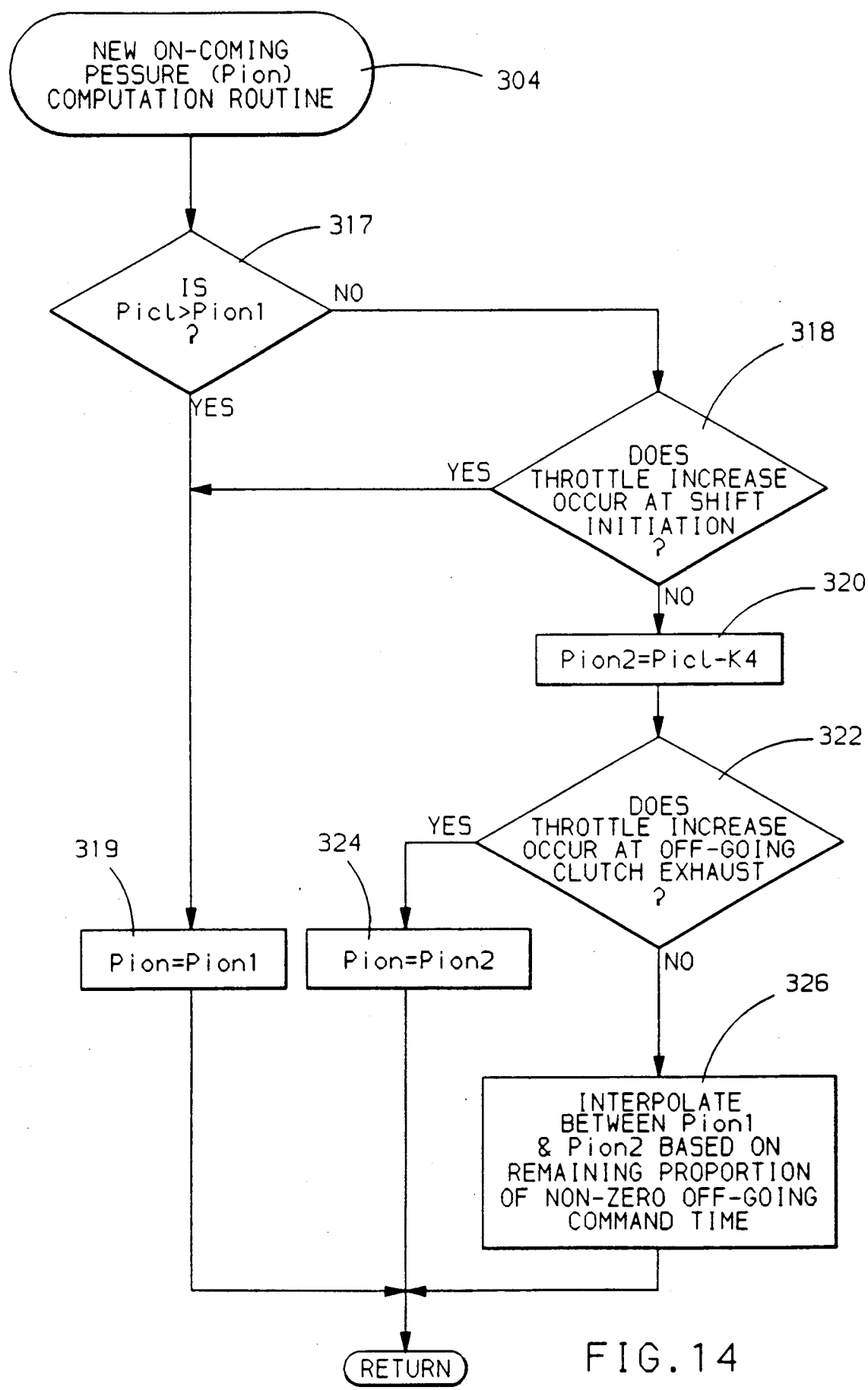

The flow diagram of FIG. 14 shows the on-coming pressure computation routine <304>. If Pic1 is greater than Pion1 <317>, or if the throttle increase occurs at shift initiation <318>, Pion is set equal to the set value P-ion1 <319>. Otherwise, the second pressure value is calculated as Pion2=Pic1−K4 <320>. If the throttle increase occurs at the time of off-going clutch exhaust <322>, P-ion is set to Pion2 <324>. If the throttle increase is detected at an intermediate time in the off-going clutch period, the interpolation step occurs <326> to find an intermediate value for Pion. Then the powered downshift transition routine proceeds.

Figure 15:
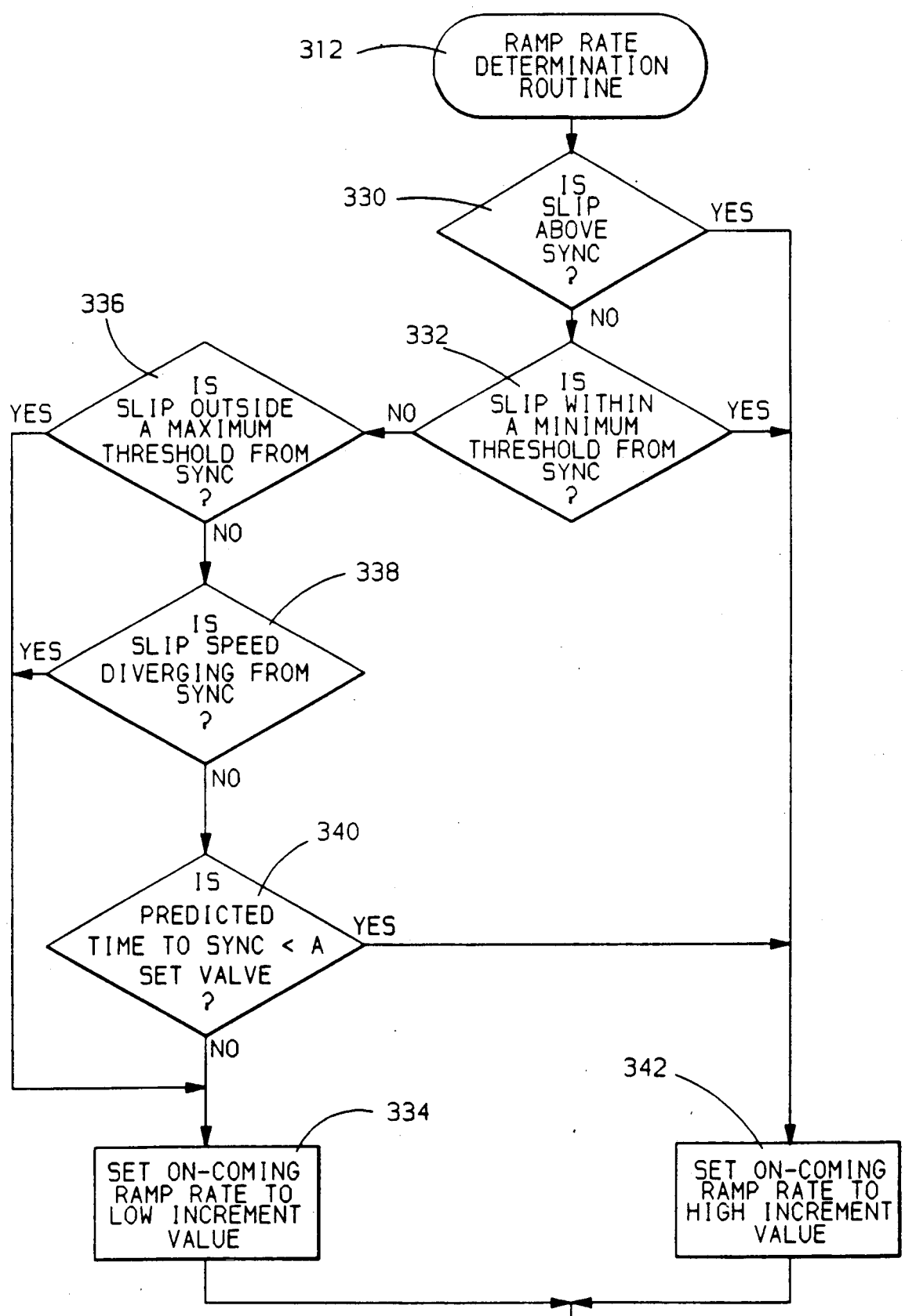
Figure 16:
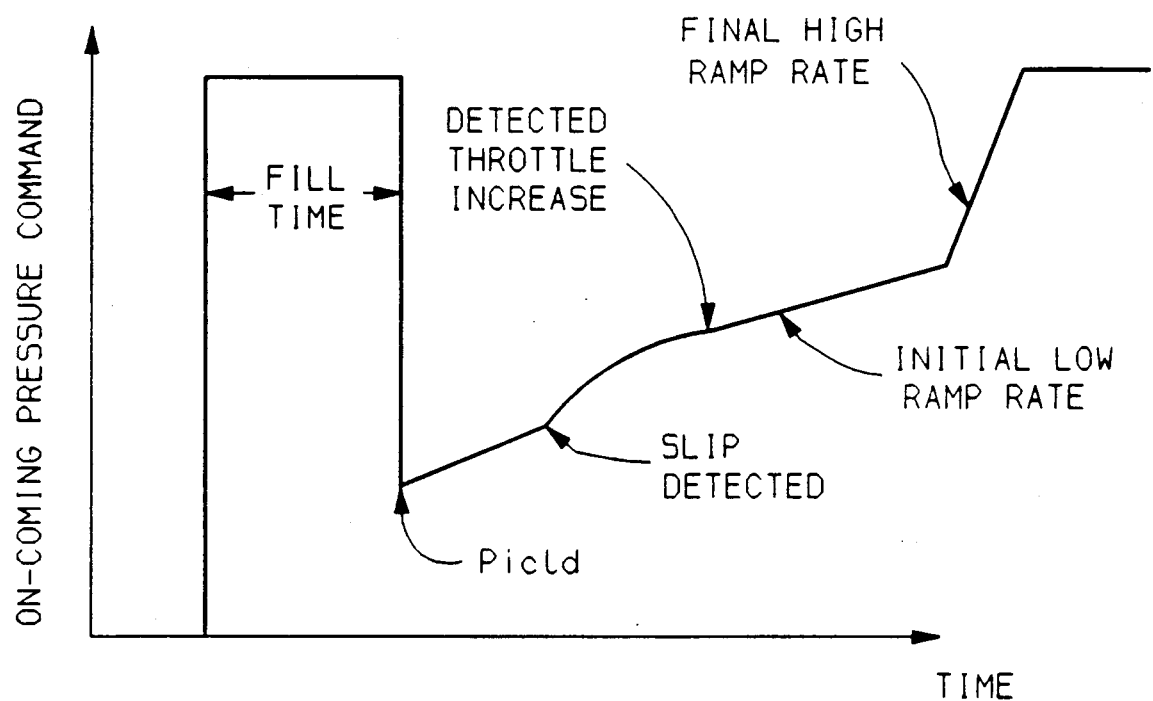
FIG. 16 is an on-coming pressure command diagram for one case of control after detection of throttle increase during closed throttle downshift according to the invention.

The flow diagram of FIG. 15 illustrates the ramp rate determination routine 312 which is used when the off-going clutch pressure command is zero and it is desired to complete the engagement of the on-coming clutch by open-loop control. The diagram of FIG. 16 complements FIG. 15 by showing one example of on-coming pressure command under these conditions. The objective is to achieve synchronization and prevent turbine speed flare above synchronization while not requiring reactivation of the off-going clutch which has already been exhausted. This is accomplished by ramping up the on-coming pressure at an initial rate beginning at the detection of throttle increase until on-coming slip is close to or "above sync" and then increase the pressure at a final, higher rate to complete the shift. Here, the term "above sync" means the turbine speed is higher than that required for on-coming clutch synchronization. In the ramp rate determination routine 312, if slip is not above sync <330> and is not within a minimum threshold of sync <332>, the ramp rate will be set to a low increment value <334> provided that either the slip is outside a maximum threshold from sync <336> or the slip speed is diverging from synchronization <338>. If the slip is within the maximum threshold <336>, the slip speed is converging on synchronization <338>, and the predicted time to attain sync is not less than a set period, the low increment value will also be selected <334>; however, a high increment value is selected <342> if the predicted time to attain sync is less than the set period <340>. The high increment value is also elected when the slip is above sync <330> or slip is within the minimum threshold from sync <332>.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, in which a closed throttle downshift from a first transmission speed ratio to a second transmission speed ratio is carried out through concurrent disengagement of an off-going fluid pressure operated torque transmitting device associated with the first of such speed ratios and engagement of an on-coming fluid pressure operated torque transmitting device associated with the second of such speed ratios, and further having turbine and output speed sensing means, a method of electronically controlling the torque transmitting devices to effect a shifting under closed throttle conditions from the first speed ratio to the second speed ratio comprising the steps of:

commanding a fill pressure on the on-coming torque transmitting device for a fill time for filling the device, commanding a predetermined pressure on the off-going torque transmitting device for a time less than the fill time and then exhausting the off-going device, detecting turbine speed pullup due to initial slippage of the off-going device, initiating a closed-loop control period of the on-coming torque transmitting device when turbine speed pullup is detected, during the closed-loop control period, establishing a slip profile, determining the slip of the on-coming torque transmitting device, and controlling the pressure of the on-coming torque transmitting device to control the slip of the on-coming torque transmitting device in accord with the profile, and determining synchronization of input and output elements of the on-coming torque transmitting device from the turbine speed and the output speed and increasing the pressure of the on-coming torque transmitting device to a maximum value when synchronization is detected.

2. In a vehicular automatic transmission having an input and an output, a turbine connected to the input to couple driving torque thereto, in which a closed throttle downshift from a first transmission speed ratio to a second transmission speed ratio is carried out through concurrent disengagement of an off-going fluid pressure operated torque transmitting device associated with the first of such speed ratios and engagement of an on-coming fluid pressure operated torque transmitting device associated with the second of such speed ratios, and further having turbine and output speed sensing means, a method of electronically controlling the torque transmitting devices to effect a shifting under closed throttle conditions from the first speed ratio to the second speed ratio comprising the steps of:

commanding a predetermined pressure on the on-coming torque transmitting device for a set fill time for quickly filling the device, and after the fill time commanding a predetermined initial pressure followed by an upwardly ramping pressure on the on-coming device, commanding a predetermined pressure on the off-going torque transmitting device to hold the first speed ratio until on-coming clutch capacity is achieved, exhausting the supplied pressure to the off-going torque transmitting device at a calculated exhaust time before the fill time expires to permit slip thereof and sensing such slip by detecting turbine speed pullup, initiating a closed-loop control period of the on-coming torque transmitting device when turbine speed pullup is detected, during the closed-loop control period, establishing a slip profile, measuring the slip of the on-coming torque transmitting device, and controlling the pressure of the on-coming torque transmitting device to control the slip of the on-coming torque transmitting device in accord with the profile, and determining synchronization of input and output elements of the on-coming torque transmitting device from a comparison of the turbine speed and the product of the output speed and the second speed ratio and, when a synchronization value is detected, increasing the commanded on-coming pressure to a maximum value.

3. The invention as defined in claim 2 including the steps of:

sensing an increase in throttle position during the downshift, and suspending the closed-loop control of the on-coming torque transmitting device and instead increasing the on-coming torque transmitting device pressure command by open-loop control until shift completion.

4. The invention as defined in claim 2 including the steps of:

detecting an increase in throttle position during the downshift, and when an increase in throttle position is detected after the step of exhausting the supplied pressure from the off-going torque transmitting device, suspending the closed-loop control of the on-coming torque transmitting device and implementing an alternate open-loop control method in which the on-coming pressure is increased in ramp fashion.

5. The invention as defined in claim 4 including the step of determining ramp rate on the basis of slip of the on-coming torque transmitting device comprising:

setting a first ramp rate when the slip is more than a set amount from synchronization, and setting a second ramp rate when slip is close to synchronization.

6. The invention as defined in claim 2 including the steps of detecting an increase in throttle position during the downshift, when an increase in throttle position is detected before the step of exhausting the supplied pressure from the off-going torque transmitting device, suspending the closed throttle downshift control and implementing a powered downshift control.

7. The invention as defined in claim 6 wherein the step of implementing a powered downshift control comprises:

calculating initial pressure for the on-coming torque transmitting device based on preset values and the proportion of time remaining before the calculated exhaust time of the off-going torque transmitting device, commanding a ramp pressure increase on the on-coming torque transmitting device starting at the calculated initial pressure, establishing a slip profile, and controlling the off-going torque transmitting device pressure command to control the slip of the on-coming torque transmitting device to the slip profile to thereby attain synchronization of input and output elements of the on-coming torque transmitting device.

* * * * *